US008843816B2

(12) United States Patent
Stull et al.

(10) Patent No.: US 8,843,816 B2
(45) Date of Patent: Sep. 23, 2014

(54) DOCUMENT COLLABORATION BY TRANSFORMING AND REFLECTING A DOCUMENT OBJECT MODEL

(75) Inventors: Benjamin Travis Stull, Seattle, WA (US); Nikolai Nedikov, Redmond, WA (US); Cameron John Parker, Sammamish, WA (US); Brian J. Neufeld, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 1028 days.

(21) Appl. No.: 12/109,342

(22) Filed: Apr. 25, 2008

(65) Prior Publication Data

US 2009/0271713 A1  Oct. 29, 2009

(51) Int. Cl.
*G06F 3/00* (2006.01)
*G06Q 10/10* (2012.01)

(52) U.S. Cl.
CPC ..................................... *G06Q 10/10* (2013.01)
USPC ........... 715/203; 715/200; 715/202; 715/209; 715/210; 715/273

(58) Field of Classification Search
CPC ..................................................... G06Q 10/10
USPC ......... 715/200, 202, 203, 205, 209, 210, 229, 715/234, 273
See application file for complete search history.

(56) References Cited

U.S. PATENT DOCUMENTS

| 5,890,171 | A | * | 3/1999 | Blumer et al. ................ 715/229 |
| 6,687,878 | B1 | | 2/2004 | Eintracht et al. |
| 6,912,573 | B2 | | 6/2005 | Ohkado et al. |
| 7,149,776 | B1 | * | 12/2006 | Roy et al. ...................... 709/205 |
| 7,185,274 | B1 | * | 2/2007 | Rubin et al. .................. 715/205 |
| 7,370,269 | B1 | * | 5/2008 | Prabhu et al. ................. 715/230 |
| 2003/0217171 | A1 | | 11/2003 | Von Stuermer et al. |
| 2004/0003043 | A1 | * | 1/2004 | Rajamony et al. ............ 709/205 |
| 2004/0133639 | A1 | * | 7/2004 | Shuang et al. ................ 709/204 |
| 2004/0205552 | A1 | * | 10/2004 | Vosburgh ...................... 715/513 |
| 2004/0230560 | A1 | * | 11/2004 | Elza et al. .......................... 707/1 |
| 2004/0230893 | A1 | * | 11/2004 | Elza et al. ...................... 715/511 |
| 2004/0230894 | A1 | * | 11/2004 | Elza et al. ...................... 715/511 |
| 2004/0230895 | A1 | * | 11/2004 | Elza et al. ...................... 715/511 |
| 2004/0230896 | A1 | * | 11/2004 | Elza et al. ...................... 715/511 |
| 2004/0230903 | A1 | * | 11/2004 | Elza et al. ...................... 715/513 |
| 2005/0044145 | A1 | * | 2/2005 | Quinn et al. .................. 709/205 |
| 2005/0091572 | A1 | | 4/2005 | Gavrilescu et al. |

(Continued)

OTHER PUBLICATIONS

Preston, "Rethinking Consistency Management in Real-Time Collaborative Editing Systems", Jon A Preston, 2007, pp. 128.

(Continued)

*Primary Examiner* — William Bashore
*Assistant Examiner* — Nathan Shrewsbury
(74) *Attorney, Agent, or Firm* — Andrew Smith; Jim Ross; Micky Minhas

(57) ABSTRACT

Technologies are described herein for document collaboration by transforming and reflecting a document object model. A DOM representation of a document to be shared is obtained at a host computer, transformed, and reflected to one or more participant computers. Each of the participant computers receives the DOM representation of the document and renders and displays the DOM representation locally. When the DOM representation is modified, changes to the DOM representation may also be transmitted to the participant computers, rendered, and displayed. Events occurring with respect to the DOM may also be synchronized between the host and participant computers.

15 Claims, 5 Drawing Sheets

(56) References Cited

U.S. PATENT DOCUMENTS

| | | | |
|---|---|---|---|
| 2005/0262095 A1 | 11/2005 | Beartusk et al. | |
| 2006/0041589 A1 | 2/2006 | Helfman et al. | |
| 2007/0256003 A1* | 11/2007 | Wagoner et al. | 715/501.1 |
| 2008/0059539 A1* | 3/2008 | Chin et al. | 707/203 |
| 2009/0055477 A1* | 2/2009 | Flesher et al. | 709/204 |
| 2009/0083384 A1* | 3/2009 | Bhogal et al. | 709/206 |

OTHER PUBLICATIONS

"Document Object Model (DOM) Level 2 Specification", Version 1.0, W3C (MIT, INRIA, Keio), 2000, pp. 469.

Atterer et al., "Knowing the User's Every Move: User Activity Tracking for Website Usability Evaluation and Implicit Interaction", World Wide Web Conference Committe (IW3C2), May 23-26, 2006, ACM, pp. 16.

* cited by examiner

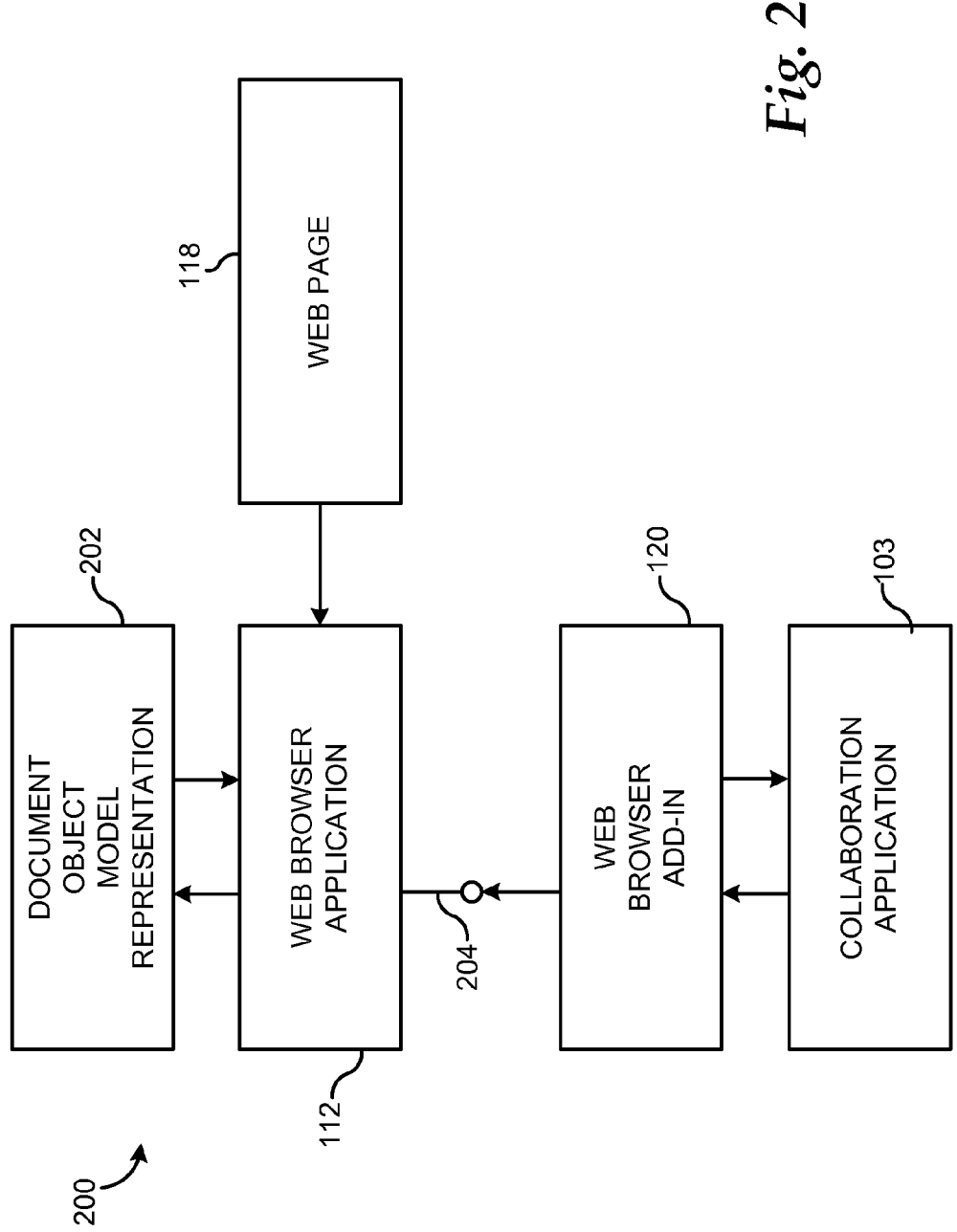

DOCUMENT COLLABORATION BY TRANSFORMING AND REFLECTING A DOCUMENT OBJECT MODEL

BACKGROUND

The utilization of desktop application programs is typically a single user experience. There are times, however, when it is desirable for several remotely located computer users to collaborate on a document by sharing the screen display of the same application program and synchronizing their interactions with the application program. For instance, it may be desirable for several remotely located computer users to jointly utilize a World Wide Web ("Web") browser application program to collaboratively browse the Web (referred to herein as "co-browsing"). It may be similarly desirable for several remotely located computer users to collaborate on other types of documents by sharing the screen display of other types of application programs, such as word processors, spreadsheet application programs, presentation applications, and others.

The most common way to share a view of a document is to utilize a screen sharing application program. Screen sharing involves capturing images of an application program displaying a document at a host computer, transmitting the captured images to one or more participant computers, and displaying the images at the participant computers. Screen sharing, however, suffers from a number of significant drawbacks. For instance, screen sharing consumes significant computing resources and network bandwidth, and may impose considerable latency at the participant computers following a change to the screen display at the host computer. Moreover, screen sharing may be impracticable if the host computer has a much higher display resolution than the participant computers.

Another method for collaborating on a document involves sharing the location of the document among the collaborators. For instance, in the context of co-browsing, the uniform resource locator ("URL") of the Web page that is to be viewed may be shared among the users. Each user may then individually utilize a Web browser application to directly load the Web page using the URL. While sharing URLs in this manner does not suffer from the same drawbacks as screen sharing, it does suffer from other drawbacks. For instance, when co-browsing using URL sharing a user may be presented with a different view of the Web page than the other users or may not be able to access the page at all depending upon their access rights to the page. Moreover, it can often be time consuming and complicated to share the locations of the documents that are to be collaborated upon among the users, such as, for instance, through the transmission of electronic mail ("e-mail") messages or other communications that include the document locations.

It is with respect to these considerations and others that the disclosure made herein is presented.

SUMMARY

Technologies are described herein for document collaboration by transforming and reflecting a document object model ("DOM"). In particular, the embodiments presented herein transmit a DOM representation of a document to the participants in a collaborative session rather than screen captures, thereby lowering the required computing resources, network bandwidth, and latency as compared to previous solutions. Moreover, because the same DOM representation of the document is rendered at each participant computer, each participant is presented with an identical view of the document even where the participant does not have access rights to view the document.

According to one aspect presented herein, a DOM representation of a document to be shared is obtained at a host computer. For instance, where a Web page is to be shared, a DOM representation of the Web page is obtained from a DOM application programming interface ("API") exposed by a Web browser. Once the DOM representation of the Web page has been obtained, the DOM representation is reflected to one or more participant computers for display. Reflection refers to the process of transmitting the DOM representation of the document to one or more participant computers. A secure collaborative data channel may be utilized between the host computer and the participant computers for the transmission of collaboration data.

Each of the participant computers receives the DOM representation of the document and renders and displays the DOM representation locally. For instance, in the case of a Web page, a Web browser executing on each of the participant computers may be utilized to render a DOM representation of the Web page. In this manner, each participant in the collaborative session receives the same DOM representation of the Web page, which is rendered locally. As a result, each participant is shown an identical view of the document.

According to aspects, the DOM representation may be transformed prior to reflection to the participant computers. The transformation may include removing, modifying, or caching any host-dependent content. For instance, in the case of a Web page, any URLs within the DOM representation of the Web page that are relative to the host computer may be transformed into absolute URLs prior to reflection. Other transformations may also be performed, such as embedding externally linked content within the document. This allows participant computers to render the Web page without fetching any referenced content such as images or stylesheets from external Web sites.

According to other aspects, events occurring with respect to the DOM representation of the document may cause an updated version of the DOM representation to be transmitted to the participant computers. For instance, if the DOM fires an event indicating that the DOM representation of the document has changed, the changed DOM representation may be transformed and reflected to the participant computers. In one embodiment, only the changes to the DOM representation of the document are transmitted to the participants, thereby conserving network bandwidth. In this manner, changes to the DOM representation of the document are continually synchronized to the participant computers.

Other types of events occurring with respect to the DOM may also be synchronized between the host and participant computers. For instance, according to aspects presented herein, mouse movement events are synchronized between the host and participant computers, thereby permitting a visual indication of the location of each participant's mouse cursor. Window size events, scroll position events, navigation events, edit events, object interaction events, and other types of events may also be synchronized between the host and the participant computers.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a software architecture diagram showing aspects of several software components provided herein;

DETAILED DESCRIPTION

Figure 1:
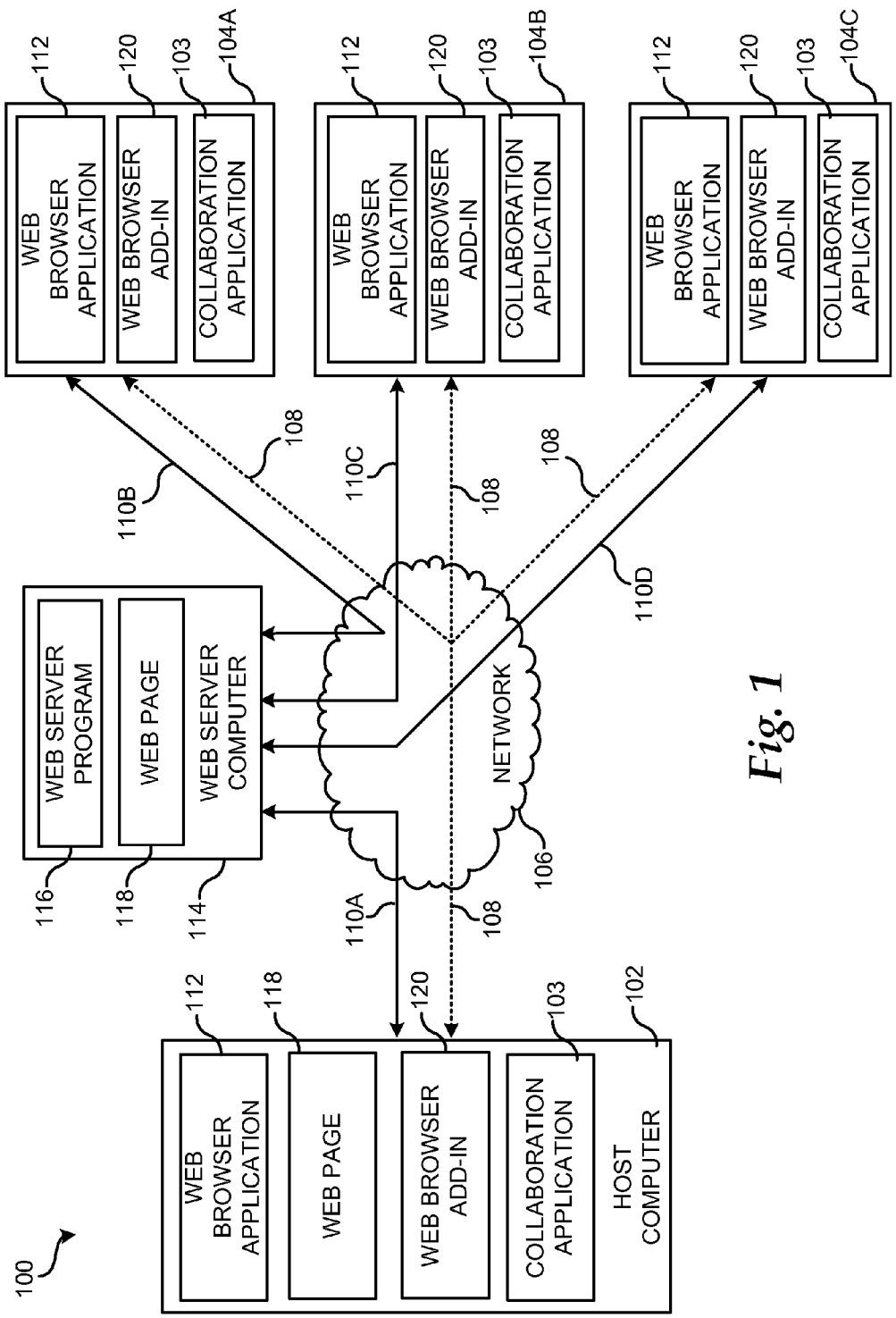
FIG. 1 is a network diagram showing aspects of an illustrative operating environment and several software components provided by the embodiments presented herein.

The following detailed description is directed to concepts and technologies for enabling document collaboration by transforming and reflecting a document object model. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for enabling document collaboration by transforming and reflecting a DOM will be described.

Turning now to FIG. 1, details will be provided regarding an illustrative operating environment and several software components provided by the embodiments presented herein. In particular, FIG. 1 shows aspects of a system 100 for enabling document collaboration by transforming and reflecting a DOM. As shown in FIG. 1, the system 100 includes a host computer 102, one or more participant computers 104A-104C, a Web server computer 114, and a network 106. The network 106 may comprise any type of suitable network for providing data communications between the host computer 102, the participant computers 104A-104C, and the Web server computer 114. Examples of such networks include local area networks and wide area networks, such as the Internet.

As discussed briefly above, the host computer 102 is configured to share a view of a document provided by a viewer application with the participant computers 104A-104C. In one implementation described herein, the viewer application comprises the Web browser application 112 and the document comprises a Web page 118. It should be appreciated, however, that the embodiments provided herein may be utilized to share a view of a document provided by virtually any type of viewer application, including word processing application programs, spreadsheet applications programs, presentation application programs, drawing application programs, and others.

In order to provide the functionality described herein for sharing a view of the Web browser application 112, a collaboration application 103 and a Web browser add-in 120 are provided. The collaboration application 103 operates in conjunction with the Web browser add-in 120 and the Web browser application 112 at the host computer 102 to transform and redirect a DOM representation of the Web page 118. As shown in FIG. 1, the collaboration application 103 and the Web browser add-in 120 is also executed on each of the participant computers 104A-104C along with the Web browser application 112. As described in greater detail herein, the collaboration application 103 interfaces with the Web browser add-in 120 to read, write, and update the DOM representation of the Web page 118. The collaboration application 103 also connects the host computer 102 and the participant computers 104A-104C through a central server or service, or through distributed technologies such as peer-to-peer communication.

As will be discussed in greater detail below, the Web browser add-in 120 executing on the participant computers 104A-104C is configured to receive the reflected DOM representation of the Web page 118 and to render and display the DOM representation at each of the participant computers 104A-104C. Additional details regarding this process will be provided below. It should be appreciated that in implementations wherein the viewer application comprises another type of application program other than a Web browser application, an appropriate add-in may be configured for use with that application that provides the functionality described herein as being performed by the Web browser add-in 120. In alternate embodiments, an application program may be configured to interoperate directly with the collaboration application 103 without the use of an add-in.

In order to enable secure communication between the Web browser add-in 120 executing at the host computer 102 and the Web browser add-ins 120 executing at each of the participant computers 104A-104C, a secure collaborative data channel 108 may be established by the collaboration application 103. According to one implementation, all of the data related to a collaborative session established between the host computer 102 and the participant computers 104A-104C is transmitted over the secure collaborative data channel 108. It should be appreciated, however, that other types of network topologies and communications links between the host computer 102 and the participant computers 104A-104C may be utilized in embodiments.

As described briefly above, the host computer 102 is configured in one embodiment to share a view of a Web page 118 with the participant computers 104A-104C. To enable this functionality, the Web browser application 112 connects to the Web server program 116 executing on the Web server computer 114 over the network link 110A. Through the network link 110A, the Web browser application 112 retrieves the Web page 118 from the Web server program 116. Once the Web browser application 112 has retrieved the Web page 118, it generates an internal DOM representation of the Web page 118.

As known in the art, the DOM representation of the Web page 118 comprises the internal representation of the Web page 118 maintained by the Web browser application 112. The DOM representation of the Web page 118 may be made available to other programs external to the Web browser application 112 through a DOM API. For instance, through the DOM API an application program may obtain the DOM representation of the Web page 118 and may register for notification of events occurring with respect to the DOM representation of the Web page 118. As an example, an application program may register to receive notification when the DOM representation of the Web page 118 has been modified.

In order to provide a view of the Web page 118 to the participant computers 104A-104C, the Web browser add-in 120 executing at the host computer 102 utilizes a DOM API exposed by the Web browser application 112 to retrieve the DOM representation of Web page 118. The Web browser add-in 120 may then transform the DOM representation of the Web page 118 prior to transmitting the DOM representation of the Web page 118 to the participant computers 104A-104C. This transformation may include, for example, removing, modifying, or caching, any content that is dependent upon the host computer 102. For instance, in the case of the Web page 118, any URLs within the DOM representation of the Web page 118 that are relative to the Web server computer 114 may be transformed into absolute URLs prior to reflection of the DOM representation of the Web page 118 to the participant computers 104A-104C.

Once the DOM representation of the Web page 118 has been transformed, the collaboration application 103 reflects the DOM representation of the Web page 118 to the collaboration applications 103 executing at the participant computers 104A-104C. The collaboration applications 103, in turn, call the Web browser add-in 120 in order to render the DOM. As used herein, the term reflection refers to the process of transmitting the DOM representation of the Web page 118 to one or more participant computers in a collaboration session. As mentioned above, the secure collaborative data channel 108 may be utilized to transmit the transformed DOM representation of the Web page 118 to the participant computers 104A-104C.

When the Web browser add-ins 120 executing at the participant computers 104A-104C receive the DOM representation of the Web page 118 from the collaboration applications 103, the Web browser add-ins 120 provide the received representation to the Web browser application 112. The Web browser application 112 then renders and displays the DOM representation of the Web page 118 at each of the participant computers 104A-104C.

In order to render content external to the DOM representation of the Web page 118, such as images and other content, each of the participant computers may connect directly to the Web server computer 114 to retrieve the content. For instance, the participant computer 104A may connect to the Web server computer 114 over the communications link 110B, the participant computer 104B may connect to the Web server computer 114 over the communications link 110C and the participant computer 104C may connect to the Web server computer over the communications link 110D.

It should be appreciated that, in other embodiments, the host computer 102 may cache the content external to the DOM representation of the Web page 118. In this embodiment, the Web browser add-ins 120 executing at each of the participant computers 104A-104C may retrieve the external content from the host computer 102 over the secure collaborative data channel 108. In other embodiments, content external to the DOM representation of the Web page 118 is sent immediately with the Dom such that it can be retrieved directly from a participant computer 104A-104C.

According to yet another embodiment, the collaborative application 103 executing at the host computer 102 may transmit the transformed DOM representation of the Web page 118 to the Web server computer 114. The Web server computer 114 may then serve the transformed DOM representation of the Web page to a collaboration server or service. In turn, the collaboration server or service transmits the DOM representation of the Web page to the collaboration applications 103 executing at the participant computers 104A-104C. In this manner, the collaboration applications 103 executing at the participant computers 104A-104C may communicate with a collaboration server or service rather than the host computer 102 to obtain the DOM representation of the Web page 118.

In order to provide changes to the DOM representation of the Web page 118 to the participant computers 104A-104C, the Web browser add-in 120 registers with the DOM API provided by the Web browser application 112 to receive notifications when the DOM representation of the Web page 118 changes. When such a notification is received, the Web browser add-in 120 again retrieves the DOM representation of the Web page 118 from the Web browser application 112, transforms the DOM representation, and reflects the transformed DOM representation to the participant computers 104A-104C. In one implementation, only the changes to the DOM representation of the Web page 118 are reflected to the participant computers 104A-104C.

When each of the participant computers 104A-104C receives an update to the DOM representation of the Web page 118, the Web browser add-in 120 causes the updated DOM representation of the Web page to be rendered and displayed by the Web browser application 112 executing at the participant computers 104A-104C. In this manner, updates to the DOM representation of the Web page 118 are displayed at each of the participant computers 104A-104C.

According to other embodiments, the Web browser add-in 120 executing at the host computer 102 and the participant computers 104A-104C may register to receive notification of other types of events occurring with respect to the DOM representation of the Web page 118. For instance, in one implementation, the Web browser add-in 120 executing at the host computer 102 and the participant computers 104A-104C register for mouse movement events occurring at the respective computing systems. When mouse movement events are received, the events are reflected to other participants in the collaborative session. In response to receiving such events, the Web browser add-in 120 is configured to display a mouse cursor corresponding to each of the participants in the collaborative session. The mouse cursor displayed by the Web browser add-in 120 may be displayed in a manner to identify the user to which the mouse cursor corresponds and to also distinguish the mouse cursor from a mouse cursor provided by an operating system. For instance, according to implementations, a pictorial representation of a mouse cursor may be provided that includes the name of each participant and possibly other formatting that distinguishes the various mouse cursors from one another, such as coloring, shading, or other types of formatting.

According to another embodiment, the Web browser add-in 120 executing at the host computer 102 registers for window size events occurring with respect to the Web browser application 112. These events are also reflected to the participant computers 104A-104C and instantiated thereupon. In this manner, if the size of a graphical user interface window provided by the Web browser application 112 is modified by a user of the host computer 102, Web browser windows provided by the Web browser applications executing on the participant computers 104A-104C will be resized in a similar manner.

According to another embodiment, the Web browser add-in 120 executing at the host computer 102 may register to receive scroll position events occurring with respect to a window provided by the Web browser application 112. These events are also reflected from the host computer 102 to the participant computers 104A-140C and instantiated thereupon. In this manner, if a user of the host computer 102 scrolls a window provided by the Web browser application 112 for displaying the Web page 118, each of the participant computers 104A-104C will similarly scroll their windows.

According to yet another embodiment, the Web browser add-in 120 executing at both the host computer 102 and the participant computers 104A-104C may register with the Web browser application 112 to receive notification of navigation events. Navigation events correspond to the selection of links or other navigation objects within a Web page 118. These events are reflected between the host computer and the participant computers 104A-104C. In this manner, when a participant within a collaborative session clicks on a URL within the Web browser application 112, an event is sent to each of other participants so that their Web browser application 112 can navigate to the same page. The DOM representation of the new page is then reflected to all participants in the collaborative session, including the user that performed the navigation.

According to other implementations, the Web browser add-ins 120 executing at the host computer 102 and the participant computers 104A-104C may also register for and reflect edit events. Edit events refer to events taking place with respect to a DOM representation of the Web page 118 for editing the content contained therein. For instance, when a participant utilizing the host computer 102 types text within an edit box contained within the Web page 118, an event will be generated and provided to the Web browser add-in 120 executing at the host computer 102. In turn, the Web browser add-in 120 reflects the event to each of the participant computers 104A-104C where the event is then instantiated thereupon. In this manner, a participant utilizing the host computer 102 can edit portions of the Web page 118 and have these edits synchronized with the participant computers 104A-104C. Edits made at the participant computers 104A-104C can also be synchronized to the host computer 102 in a similar manner. The manner in which edits are synchronized between the host computer 102 and the participant computers 104A-104C may be specified through the use of a permissions model.

According to yet another embodiment, the Web browser add-in 120 may be configured to register for notification of object interaction events. Object interaction events are events generated when a user of the host computer 102 interacts with an object embedded within the Web page 118, such as a video player or other type of object. In this way, the Web browser add-in 120 receives notification when a user of the host computer 102 presses play or pause, for instance, on a video embedded within the Web page 118. The Web browser add-in 120 executing at the host computer 102 reflects these events to the participant computers 104A-104C where they are instantiated. In this way, the playing, pausing, or seeking of a video or other type of multimedia file contained within the Web page 118 may be synchronized between the host computer 102 and the participant computers 104A-104C.

It should also be appreciated, that the Web browser add-in 120 may maintain information, according to embodiments, outside of the DOM representation of the Web page 118 and display this information over the display provided by the Web browser application 112. For instance, in one implementation, the Web browser add-in 120 provides functionality at the host computer 102 and the participant computers 104A-104C for allowing a user to place translucent highlighting over the display of the Web page 118. This highlighting is reflected between each of the participants within the collaborative session. It should be appreciated that other types of collaborative tools may also be provided by the Web browser add-in 120 according to other implementations.

Referring now to FIG. 2, an illustrative software architecture 200 will be described. The software architecture 200 illustrated in FIG. 2 is utilized by the host computer 102 and each of the participant computers 104A-104C. The software architecture 200 includes a Web browser 112 that is configured to communicate with the Web server program 116 to retrieve the Web page 118. As discussed briefly above, the Web browser application 112 is also configured to generate and utilize a document object model representation 202 of the Web page 118.

As also described above, the Web browser application 112 exposes a DOM API 204 that allows external programs to obtain the DOM representation 202 of the Web page 118 and to register for notification of events occurring with respect to the DOM. For instance, as illustrated in FIG. 2, the Web browser add-in 120 may utilize the DOM API 204 to obtain the DOM representation 202 of the Web page 118 and to register for the mouse movement, window size, scroll position, navigation, edit, and object interaction events described above.

It should be appreciated that other types of application programs for creating and viewing other types of documents also maintain DOM representations of those documents and provide an API for obtaining the DOM representation and for receiving notification of events with respect to the DOM representation. It should also be appreciated that, according to embodiments, the Web browser add-in 120 may register with an operating system executing on the host computer 102 or the participant computers 104A-104C for notification of certain types of events occurring with respect to Web browser application 112.

Figure 3A:
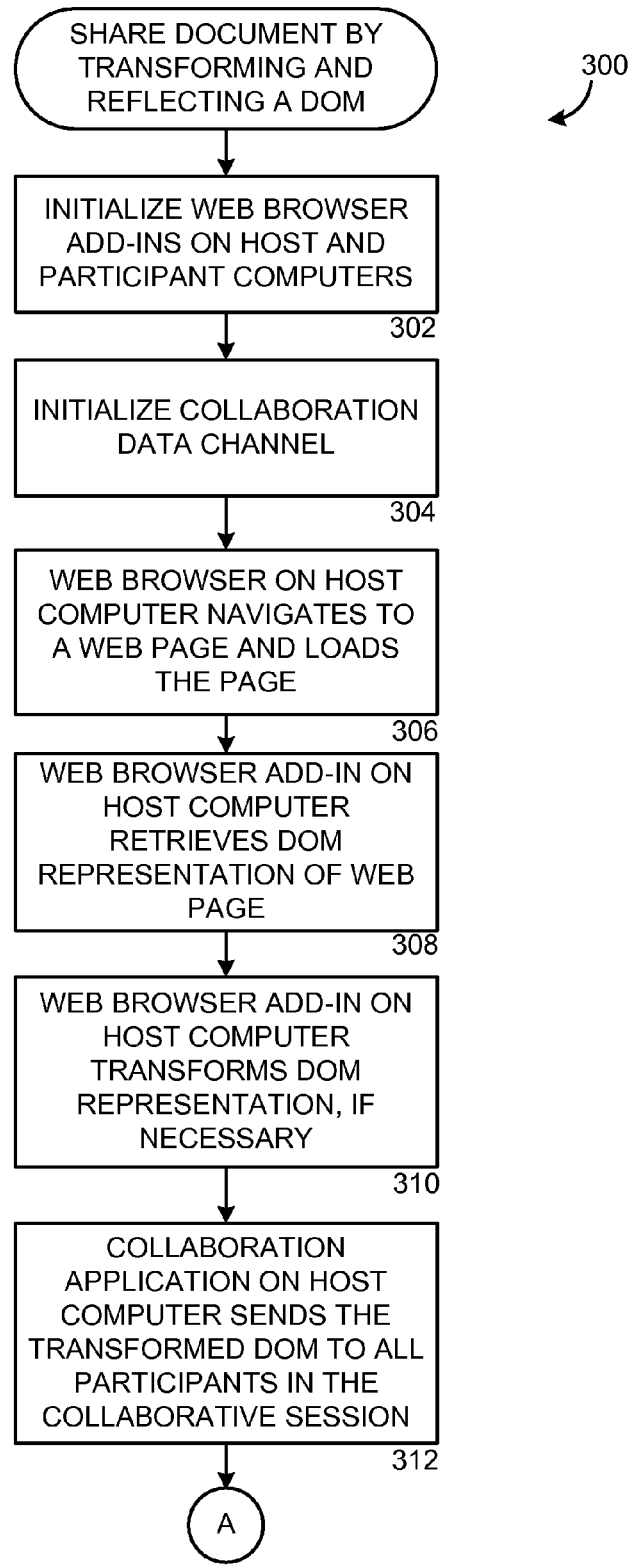
FIGS. 3A-3B are flow diagrams showing an illustrative routine for application sharing by transforming and reflecting a DOM in one embodiment presented herein.
Figure 3B:
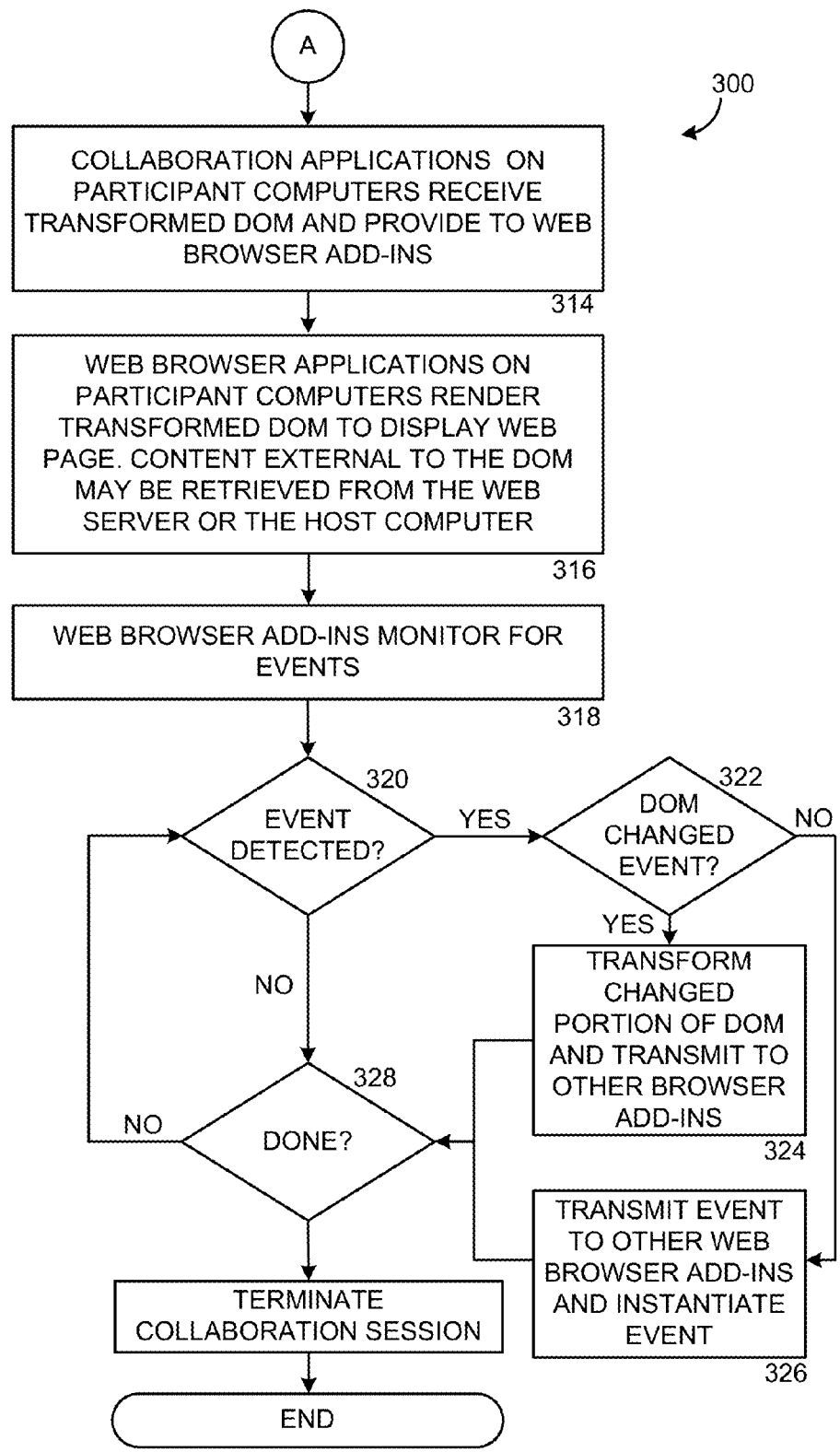

Referring now to FIGS. 3A-3B, additional details will be provided regarding the embodiments presented herein for document collaboration by transforming and reflecting a document object model. In particular, FIGS. 3A-3B show a flow diagram illustrating aspects of the operation of the Web browser add-in 120 for transforming and reflecting a DOM representation of a document. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300 begins at operation 302, where the Web browser add-in 120 executing at the host computer 102 and each of the participant computers 104C-104A are initialized. The routine 300 then continues to operation 304, where the secure collaborative data channel 108 is established between the host computer 102 and the participant computers 104A-104C. As discussed above, the secure collaborative data channel 108 may be utilized in embodiments to transmit all of the data related to a collaborative session. Once the secure collaborative data channel 108 has been initialized, the routine 300 proceeds from operation 304 to operation 306.

At operation 306, the Web browser application 112 executing at the host computer 102 is utilized to navigate to a Web page 118. In response to such a navigation, the Web browser application 112 connects to the Web server program 116, retrieves the Web page 118, and generates the DOM representation 202 of the Web page 118. The routine 300 then continues to operation 308, where the Web browser add-in 120 executing at the host computer 102 retrieves the DOM representation 202 of the Web page 118 from the Web browser application 112.

Once the DOM representation 202 of the Web page 118 has been retrieved, the Web browser add-in 120 transforms the DOM representation, if necessary. As discussed above, according to embodiments, the Web browser add-in 120 may transform the DOM representation 202 by removing, modifying, or caching any host-dependent content. In the case of the Web page 118, the Web browser add-in 120 transforms any URLs within the DOM representation 202 that are relative to the Web server computer 114 into absolute URLs during the transformation process. This occurs at operation 310.

From operation 310, the routine 300 proceeds to operation 312 where the collaboration application 103 executing at the host computer 102 reflects the transformed DOM representation of the Web page 118 to each of the participant computers 104A-104C. The routine 300 then proceeds to operation 314, where the collaboration applications 103 executing at the participant computers 104A-104C receive the transformed DOM and provide to the Web browser add-ins 120. In turn, the Web browser add-ins 120 provide the transformed DOM to the Web browser applications 112 executing on each of the respective participant computers 104A-104C.

From operation 314, the routine 300 continues to operation 316, where the Web browser applications 112 executing at each of the participant computers 104A-104C render and display the DOM representation. In this manner, a display generated by the Web browser application 112 at the host computer 102 is provided at each of the participant computers 104A-104C. As discussed above, according to embodiments the participant computers 104A-104C may retrieve data external to the Web page 118 directly from the Web server computer 104 or from the host computer 102 in order to render the Web page 118.

From operation 316, the routine 300 continues to operation 318, where the Web browser add-ins 120 executing at the host computer 102 and the participant computers 104A-104C monitor for events occurring with respect to the DOM representation of the Web page 118. The routine 300 then proceeds to operation 320, where a determination is made as to whether an event was detected. If no events are detected, the operation 300 proceeds to operation 328, described below. If, however, an event is detected, the routine 300 proceeds from operation 320 to operation 322.

At operation 322, the Web browser add-in 120 determines whether the detected event indicates that the DOM representation 202 of the Web page 118 has been changed. If the DOM representation 202 of the Web page 118 has been changed, the routine 300 proceeds from operation 322 to operation 324. At operation 324, the Web browser add-in 120 transforms the changed portion of the DOM representation 202 and transmits the changes to the participant computers 104A-104C. From operation 324, the routine 300 proceeds to operation 328, described below.

If, at operation 322, the Web browser add-in 120 determines that the detected event was not a DOM change event, the routine 300 proceeds from operation 322 to operation 326. At operation 326, the detected event is reflected to the participant computers 104A-104C where the event is instantiated. As discussed above, mouse movement events, window size events, scroll position events, navigation events, edit events, object interaction events, and other types of events may be detected at each of the computers and reflected in this manner. The host computer 102 may also detect and reflect these events to the participant computers 104A-104C in a similar manner. From operation 326, the routine 300 proceeds to operation 328.

At operation 328, a determination is made as to whether the collaborative session has been completed. If the collaboration session has not been completed, the routine 300 returns from operation 328 to operation 320, described above where additional changes to the DOM representation 202 and events are reflected to the participants in the collaborative session. If the collaborative session has been completed, the routine 300 proceeds from operation 328 to operation 330 where the collaborative session is terminated. This may include, for instance, disconnecting the secure collaborative data channel 108 established between the host computer 102 and the participant computers 104A-104C. From operation 330, the routine 300 continues to operation 332, where it ends.

Figure 4:
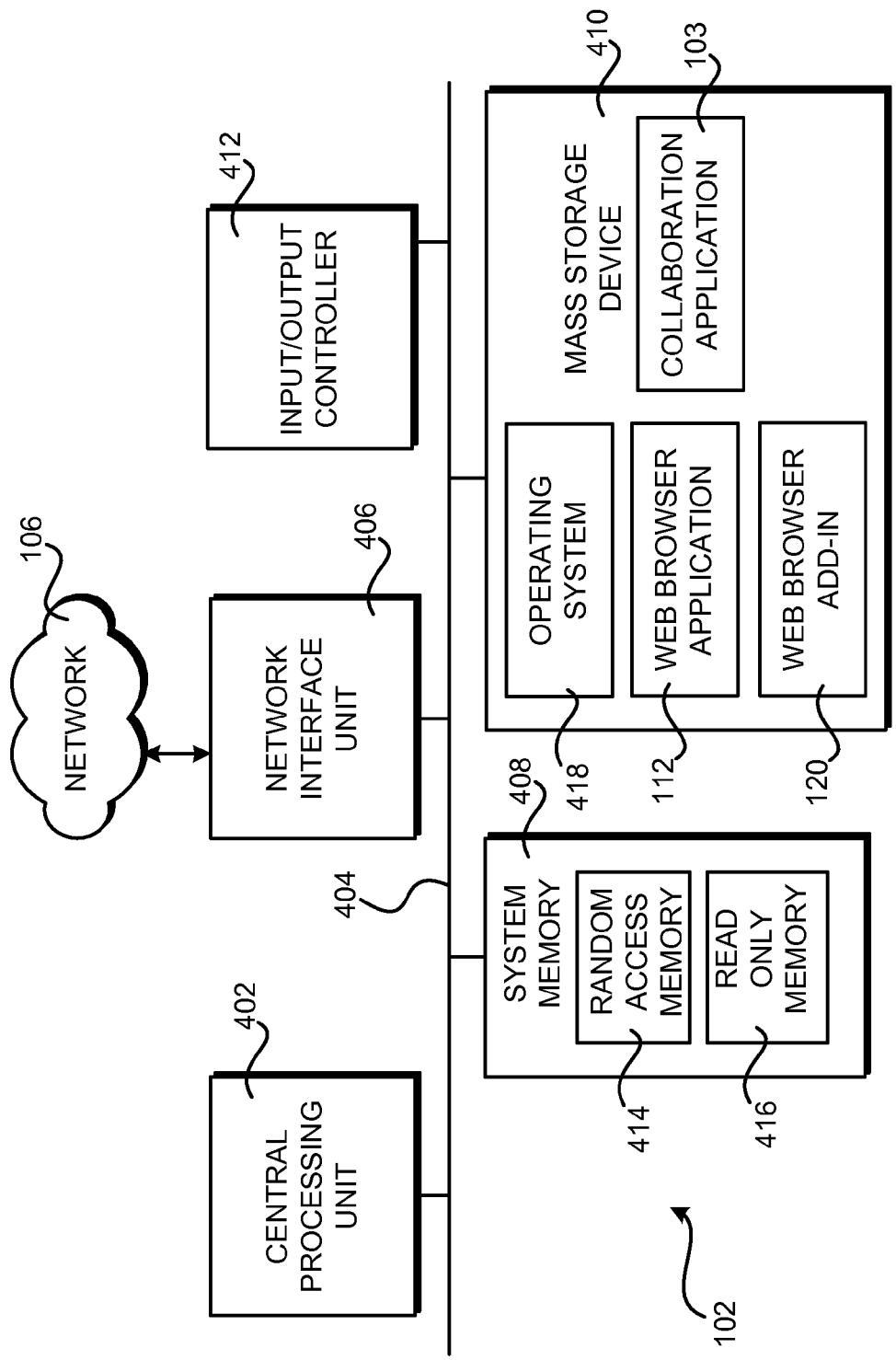
FIG. 4 is a computer architecture diagram showing an illustrative computer hardware and software architecture for a computing system capable of implementing aspects of the embodiments presented herein.

FIG. 4 shows an illustrative computer architecture for a host computer 102 capable of executing the software components described herein for enabling document collaboration by transforming and reflecting a DOM in the manner presented above. The computer architecture shown in FIG. 4 illustrates a conventional desktop, laptop, or server computer and may be utilized to execute any aspects of the software components presented herein described as executing on the host computer 102, the participant computers 104, and the Web server computer 114.

The computer architecture shown in FIG. 4 includes a central processing unit 402 ("CPU"), a system memory 408, including a random access memory 414 ("RAM") and a read-only memory ("ROM") 416, and a system bus 404 that couples the memory to the CPU 402. A basic input/output system containing the basic routines that help to transfer information between elements within the computer 400, such as during startup, is stored in the ROM 416. The host computer 102 further includes a mass storage device 410 for storing an operating system 418, application programs, and other program modules, which are described in greater detail herein.

The mass storage device 410 is connected to the CPU 402 through a mass storage controller (not shown) connected to the bus 404. The mass storage device 410 and its associated computer-readable media provide non-volatile storage for the host computer 102. Although the description of computer-readable media contained herein refers to a mass storage device, such as a hard disk or CD-ROM drive, it should be appreciated by those skilled in the art that computer-readable media can be any available computer storage media that can be accessed by the host computer 102.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the host computer 102.

According to various embodiments, the host computer 102 may operate in a networked environment using logical connections to remote computers through a network such as the network 106. The host computer 102 may connect to the network 106 through a network interface unit 406 connected to the bus 404. It should be appreciated that the network interface unit 406 may also be utilized to connect to other types of networks and remote computer systems. The host computer 102 may also include an input/output controller 412 for receiving and processing input from a number of other devices, including a keyboard, mouse, or electronic stylus (not shown in FIG. 4). Similarly, an input/output controller may provide output to a display screen, a printer, or other type of output device (also not shown in FIG. 4).

As mentioned briefly above, a number of program modules and data files may be stored in the mass storage device 410 and RAM 414 of the computer 400, including an operating system 418 suitable for controlling the operation of a networked desktop, laptop, or server computer. The mass storage device 410 and RAM 414 may also store one or more program modules and associated data. In particular, the mass storage device 410 and the RAM 414 may store the Web browser application 112, the Web browser add-in 120, and the collaboration application 103, each of which was described in detail above with respect to FIGS. 1-3B.

Based on the foregoing, it should be appreciated that technologies for document collaboration by transforming and reflecting a document object model are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for sharing a document, the method comprising:
    obtaining, at a host computer, a document for sharing with a participant computer in communication with the host computer, wherein the participant computer does not have access rights to view the document;
    generating, at the host computer, a document object model (DOM) representation of the document, the DOM representation comprising host-dependent content;
    determining whether an event indicates that the DOM representation has been changed;
    if the event indicates that the DOM representation has not been changed, reflecting the event to the participant computer to instantiate the event at the participant computer, wherein the event comprises at least one of a mouse movement event, a window size event, a scroll position event or a navigation event;
    if the event indicates that the DOM representation has been changed, modifying the host-dependent content of the DOM representation of the document to obtain a transformed document object model (DOM) representation; and
    allowing the participant computer to view the document by reflecting the transformed DOM representation to the participant computer for rendering of the document and the content external to the DOM representation at the participant computer.

2. The method of claim 1, wherein transforming the DOM representation of the document comprises removing the host-dependent content from the DOM.

3. The method of claim 1, further comprising:
    determining whether the DOM representation of the document has a change made at the host computer after the transformed DOM was reflected to the participant computer; and
    in response to determining that the DOM representation of the document has the change,
        modifying the DOM to obtain a modified DOM, and
        transmitting the modified DOM to the participant computer.

4. The method of claim 1, further comprising:
    determining whether the DOM representation of the document has a change made at the host computer after the transformed DOM was reflected to the participant computer; and
    in response to determining that the DOM representation of the document has the change,
        identifying the change to the DOM representation of the document, and
        transmitting information identifying the change to the participant computer without transmitting the DOM representation of the document further.

5. The method of claim 1, further comprising:
    determining whether the event has occurred at the host computer with respect to the DOM representation of the document after the transformed DOM was reflected to the participant computer; and
    in response to determining that the event has occurred with respect to the DOM representation of the document,
        modifying the DOM according to the event to obtain a modified DOM, and
        transmitting the modified DOM to the participant computer to reflect the event for instantiation at the participant computer.

6. The method of claim 5, wherein the event comprises an edit event.

7. The method of claim 5, wherein the event comprises an object interaction event.

8. A computer comprising:
    a processor; and
    a computer storage medium having computer executable instructions stored thereon which, when executed by the processor, cause the computer to obtain, from a web server, a document for sharing with participant computers in communication with the computer during a collaboration session, the document comprising host-dependent content, wherein each of the participant computers does not have access rights to view the document;
generate a document object model (DOM) representation of the document at the computer, the DOM representation of the document comprising the host-dependent content;
obtain content external to the DOM representation;
determine whether an event indicates that the DOM representation has been changed;
if the event indicates that the DOM representation has not been changed, reflect the event to the participant computer to instantiate the event at the participant computer, wherein the event comprises at least one of a mouse movement event, a window size event, a scroll position event or a navigation event;
if the event indicates that the DOM representation has been changed, transform the DOM representation of the document to modify the host-dependent content to obtain a transformed document object model (DOM) representation;
allow each of the participant computers to view the document by reflecting the transformed DOM representation to the participant computers for rendering of the document at the participant computers; and
allow each of the participant computers to obtain and render the content external to the DOM representation, the participant computers configured to receive the content external to the DOM representation from the computer or from the web server.

9. The computer of claim 8, wherein the computer storage medium comprises further computer executable instructions which, when executed by the processor, cause the computer to:
determine whether the DOM representation of the document has a change made at the computer after the transformed DOM was reflected to the participant computers; and
in response to determining that the DOM representation of the document has the change,
to identify the change to the DOM representation of the document, and to transmit the change to the participant computers without transmitting the DOM representation of the document.

10. The computer of claim 8, wherein the computer storage medium comprises further computer executable instructions which, when executed by the processor, cause the computer to:
determine whether the event has occurred at the computer with respect to the DOM representation of the document after the transformed DOM was reflected to the participant computers; and
in response to determining that the event has occurred with respect to the DOM representation of the document,
to modify the DOM according to the event to obtain a modified DOM, and
to transmit the modified DOM to the participant computers to reflect the event for instantiation at the participant computers.

11. The computer of claim 10, wherein the document comprises a world wide Web (Web) page, and wherein the DOM representation of the document comprises a DOM representation of the Web page.

12. The computer of claim 11, wherein transforming the DOM representation of the document comprises transforming one or more relative uniform resource locators (URLs) in the DOM representation of the Web page into absolute URLs.

13. The computer of claim 8, wherein transforming the DOM representation of the document comprises removing the host-dependent content from the transformed DOM representation.

14. A method for sharing a document, the method comprising:
obtaining, at a host computer from a web server computer, a Web page for sharing with participant computers participating in a collaborative session hosted by the host computer, wherein the participant computers communicate with the host computer using a secure collaborative data channel established between the host computer and the participant computers, wherein the participant computers communicate with the web server computer using a network connection, and wherein the participant computers do not have access rights to view the Web page;
generating, at the host computer, a document object model (DOM) representation of the Web page, the DOM representation comprising a relative uniform resource locator (URL) included in the Web page;
obtaining, at the host computer from the web server computer, content external to the DOM representation;
transforming the DOM representation of the Web page to obtain a transformed document object model (DOM) representation, wherein transforming the DOM representation of the Web page comprises transforming the relative URL into an absolute URL;
allowing each of the participant computers to view the Web page by reflecting the transformed DOM representation to the participant computers for rendering the Web page at the participant computers;
allowing each of the participant computers to obtain and render the content external to the DOM representation, the participant computers configured to receive the content external to the DOM representation from the host computer using the secure collaborative data channel or from the web server computer using the network connection;
detecting an event occurring at the host computer with respect to the Web page displayed at the host computer;
determining whether the event indicates that the DOM representation has been changed;
if the event indicates that the DOM representation has not been changed, reflecting the event to the participant computer to instantiate the event at the participant computer, wherein the event comprises at least one of a mouse movement event, a window size event, a scroll position event or a navigation event;
if the event indicates that the DOM representation has been changed, generating a modified transformed DOM representation of the Web page in accordance with the event; and
reflecting the modified transformed DOM representation of the Web page to the participant computers for rendering at the participant computers.

15. The method of claim 14, wherein the event further comprises at least one of
an edit event, or
an object interaction event.

* * * * *